(12) United States Patent
Ujita et al.

(10) Patent No.: US 6,613,131 B2
(45) Date of Patent: Sep. 2, 2003

(54) GAS-LIQUID SEPARATION MEMBRANE AND PRODUCTION METHOD THEREOF

(75) Inventors: Toshihiko Ujita, Kanagawa (JP); Junji Shimoda, Kanagawa (JP); Akira Tsujimoto, Kanagawa (JP); Yasuo Kotaki, Kanagawa (JP); Kiyomitsu Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/245,649

(22) Filed: Sep. 18, 2002

(65) Prior Publication Data

US 2003/0066426 A1 Apr. 10, 2003

(30) Foreign Application Priority Data

Sep. 20, 2001 (JP) ........................................ 2001-287359

(51) Int. Cl.[7] ............................ B01D 53/22; B01D 19/00
(52) U.S. Cl. ...................... 96/6; 96/13; 96/14; 95/46; 55/DIG. 5
(58) Field of Search ...................... 95/46; 96/4, 6, 96/11, 13, 14; 55/524, DIG. 5

(56) References Cited

U.S. PATENT DOCUMENTS

| 366,081 | A | * | 7/1887 | Edgerton | 423/655 |
|---|---|---|---|---|---|
| 3,777,809 | A | * | 12/1973 | Milde, Jr. | 165/54 |
| 3,778,971 | A | * | 12/1973 | Granger et al. | 96/6 |
| 4,620,932 | A | * | 11/1986 | Howery | 210/808 |
| 4,787,921 | A | * | 11/1988 | Shibata et al. | 96/6 |
| 5,316,568 | A | * | 5/1994 | Brown | 95/31 |
| 5,391,072 | A | * | 2/1995 | Lawton et al. | 425/174.4 |
| 5,492,705 | A | * | 2/1996 | Porchia et al. | 426/106 |
| 5,510,176 | A | | 4/1996 | Nakamura et al. | 428/316.6 |
| 5,534,178 | A | * | 7/1996 | Bailly et al. | 510/367 |
| 5,844,200 | A | * | 12/1998 | Leader et al. | 219/121.71 |
| 6,383,386 | B1 | * | 5/2002 | Hying et al. | 210/500.25 |
| 6,433,304 | B2 | * | 8/2002 | Okumura et al. | 219/121.71 |
| 2001/0042711 | A1 | * | 11/2001 | Hintsche | 210/490 |
| 2003/0029787 | A1 | * | 2/2003 | Liu et al. | 210/416.1 |

FOREIGN PATENT DOCUMENTS

| JP | 5-214140 | 8/1993 |
|---|---|---|
| JP | 7-124452 | 5/1995 |

* cited by examiner

Primary Examiner—Robert H. Spitzer
(74) Attorney, Agent, or Firm—Fitzpatrick, Cella, Harper & Scinto

(57) ABSTRACT

A gas-liquid separation membrane is provided with high reliability and performance while having gas-permeable pores formed independently of each other in even pore size and in uniform distribution. The gas-liquid separation membrane has a plurality of gas-permeable pores that permit permeation of gas and that prevent permeation of liquid by capillary force, and the plurality of gas-permeable pores are formed independently of each other and in even pore size by laser machining.

17 Claims, 7 Drawing Sheets

GAS-LIQUID SEPARATION MEMBRANE AND PRODUCTION METHOD THEREOF

BACKGROUND OF THE INVENTION

1. Field of the Invention

The present invention relates to a gas-liquid separation membrane provided with a plurality of gas-permeable pores that permit permeation of gas and prevent permeation of liquid by capillary force, and a production method thereof.

2. Related Background Art

A variety of proposals have been made heretofore on methods of utilizing gas-liquid selectivity of a membrane for separating a gas component or a liquid component from a state of gas-liquid mixed flow or gas-liquid two-phase flow. The gas-liquid separation membranes are generally categorized under two types, first and second types, which have their respective characteristics.

The gas-liquid separation membranes of the first type utilize gas permeability (diffusion) of membrane materials themselves and, specifically, they separate gas from liquid by the in-membrane diffusion difference between gas and liquid. Under this principle, however, the gas permeation speed is low, which raises various obstacles in practical use. One of countermeasures is a method of increasing the membrane area. The increase of the membrane area, however, results in increase in complexity and scale of the mechanism and increase in weight as well, which hinders decrease in scale and weight of apparatus using it.

The gas-liquid separation membranes of the second type utilize filter-like membranes provided with fine gas-permeable pores. In general, the liquid has surface tension and the capillary force appears in connection therewith. The capillary force acts stronger with decrease in the aperture size of a pore or a tube. Since the capillary force also acts at the gas-permeable pores, the membrane can prevent the permeation of liquid at the gas-permeable pores. On the other hand, the flow of gas is inhibited in inverse proportion to the cross-sectional area of the gas-permeable pores, but the gas is permitted to permeate. Therefore, the flow of gas is not interrupted, different from the liquid. As a result, the filter-like membrane with fine gas-permeable pores functions as a gas-liquid separation membrane. The capillary force is determined by the angle of contact of the liquid in the vicinity of the gas-permeable pores, and by the pore size (opening diameter) of the gas-permeable pores. When the pore sizes have some unevenness (dispersion), a force counterworking the pressure in separation of gas from liquid is theoretically dependent upon the largest pore size. In many conventional gas-liquid separation membranes the gas-permeable pores are connected to each other and these gas-permeable pores induce permeation of liquid. The gas-liquid separation membranes are also required to have the function of letting the gas smoothly permeate. The relation between the size of gas-permeable pores and the gas permeation resistance is generally expressed by the Hagen-Poiseuille formula. If the unevenness of pore sizes appears in the direction of smaller pore sizes of the gas-permeable pores, permeation efficiency of gas will be lowered. Namely, the gas-liquid separation membranes making use of the capillary force increase their performance and reliability with increase in the degree of evenness of pore sizes of the gas-permeable pores. In the case of the gas-liquid separation membranes as described, once the liquid passes through the interior of the gas-permeable pore for some reason, the capillary force will be no longer secured and the pore will permit the permeation of liquid, so as to cause leakage of the liquid, thereby damaging the function as a gas-liquid separation membrane.

As a solution to the problem in the gas-liquid separation membranes with the gas-permeable pores, Japanese Patent Application Laid-Open No. 07-124452 describes a method of making a porous film constituting the gas-liquid separation membrane, of a material with high water repellency. The porous film of this kind is obtained by making a film of a compression-molded product in which a liquid lubricant is preliminarily blended in particles of a raw material, thereafter removing the lubricant from the film, and stretching the film. This method, however, had a problem in structure, because it was difficult to make the pore sizes of the gas-permeable pores even by the method.

As a solution to this problem, Japanese Patent Application Laid-Open No. 05-214140 describes a technique of making films by compression molding of resin powder, thereafter bonding two or more films to each other, and stretching the bonded films, thereby making the pore sizes of the gas-permeable pores even.

It was, however, impossible to securely form independent gas-permeable pores by the technique as described in Japanese Patent Application Laid-Open No. 05-214140.

After all, none of the conventional methods succeeded in providing a gas-liquid separation membrane in which a plurality of gas-permeable pores were of even pore size and were independent of each other. The conventional methods also failed to solve the problem that, though the pore sizes of the gas-permeable pores were locally uniform, there occurred unevenness in the distribution of gas-permeable pores and the gas-permeable pores were connected to each other in a more macroscopic view. Therefore, the conventional methods have never permitted the gas-permeable pores to be formed independently of each other in uniform distribution and in even pore size. For this reason, the unevenness of pore sizes of the gas-permeable pores made it difficult to avoid entry of the liquid into the gas-permeable pores, and there was a limit to the performance and reliability of the gas-liquid separation membranes. It was also essentially impossible to form the gas-permeable pores with properties as desired.

SUMMARY OF THE INVENTION

An object of the present invention is to provide a gas-liquid separation membrane in which a plurality of gas-permeable pores are formed independently of each other in even pore size and in uniform distribution, while having high reliability and performance.

A gas-liquid separation membrane according to the present invention is a gas-liquid separation membrane comprising a plurality of gas-permeable pores that permit permeation of gas and that prevent permeation of liquid by capillary force, wherein the plurality of gas-permeable pores are formed independently of each other and in even pore size by laser machining.

A production method of a gas-liquid separation membrane according to the present invention is a method of producing a gas-liquid separation membrane having a plurality of gas-permeable pores that permit permeation of gas and that prevent permeation of liquid by capillary force, wherein the plurality of gas-permeable pores are formed independently of each other and in even pore size by laser machining.

DETAILED DESCRIPTION OF THE PREFERRED EMBODIMENTS

The embodiments of the present invention will be described below on the basis of the drawings.
(First Embodiment)

Figure 1:
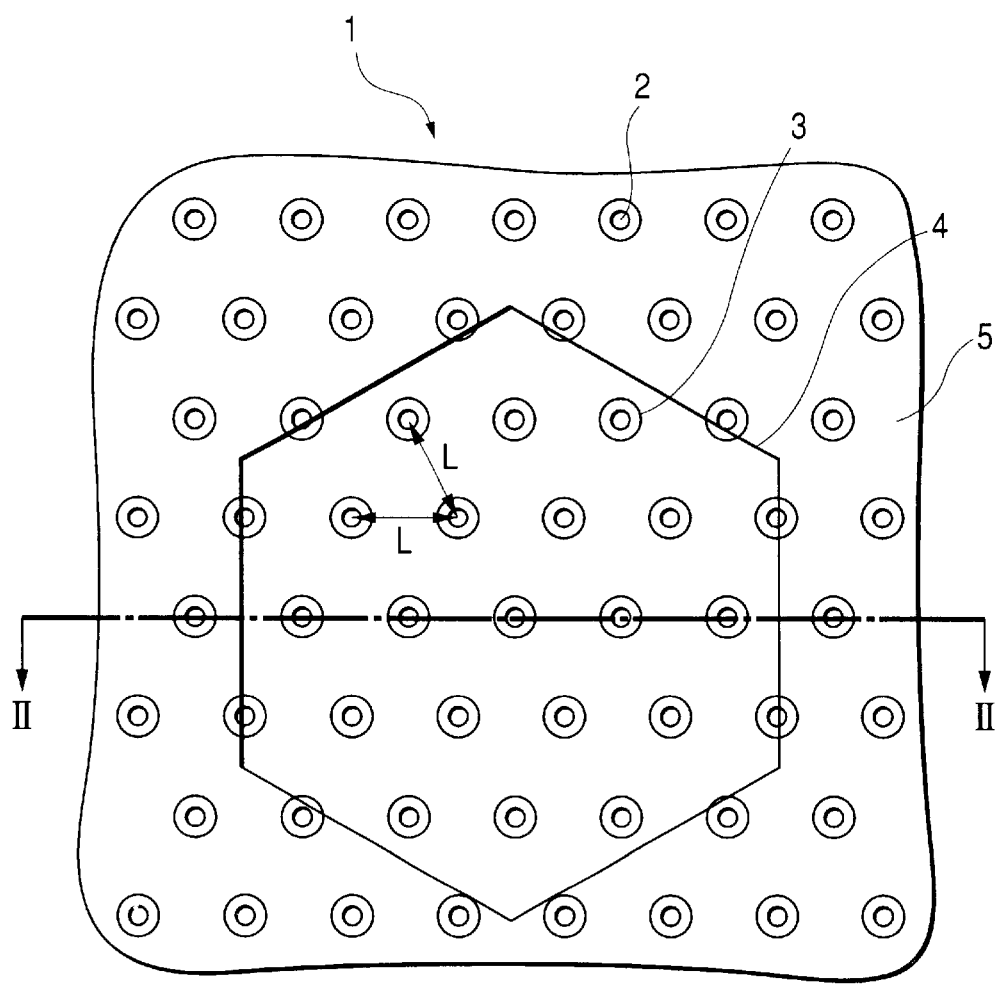
FIG. 1 is an enlarged plan view of a gas-liquid separation membrane in a first embodiment of the present invention.
Figure 2:
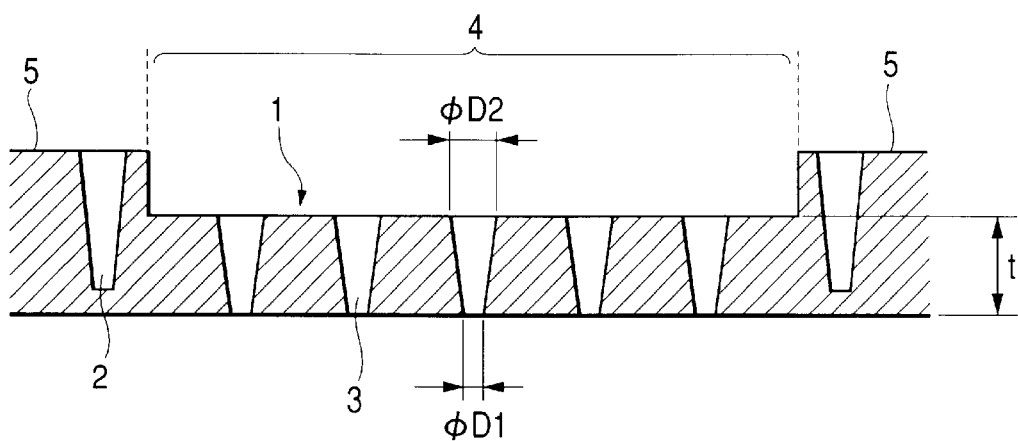
FIG. 2 is a sectional view along line II—II in FIG. 1.

FIG. 1 is an enlarged plan view of a gas-liquid separation membrane as a first embodiment of the present invention, and FIG. 2 a sectional view along line II—II of the gas-liquid separation membrane.

Numeral 1 designates a resin film (plastic film) as a molding material of the gas-liquid separation membrane, in which pores 2, 3 are precisely bored at equal intervals L by laser machining with a carbon dioxide, excimer, YAG, or other laser, as described hereinafter. The resin film 1 is preferably a material with high water repellency; e.g., one of fluorocarbon polymers including polytetrafluoroethylene of olefin base such as polyethylene, polypropylene, or the like. In the case where some mechanical strength is required, the resin film 1 can also be made of polysulfone or the like. In the case where the gas-liquid separation membrane is made of a material with relatively low water repellency, the membrane can be adapted for use by subjecting it to a fluorine-base water repellent finishing or the like. By employing a combination with an ultra-water-repellent metal film of dispersed composite nickel plating of metal and Teflon (trade mark), it is feasible to provide a gas-liquid separation membrane with higher reliability and performance.

When the even pores 2, 3 are formed by laser machining to secure even performance and reliability of the gas-liquid separation membrane, the intervals L are desirably 1.5 or more times the diameter of the pores 2, 3. The reason for it is that such setting can avoid influence of scattering of laser light in the resin film 1. Means for uniformly and efficiently forming the pores 2, 3 by laser machining as described is a method of using an optical mask having a pattern of arrangement of the pores 2, 3 to be formed and placing the optical mask in an optical path, as described later.

The pores 2 are unpierced idle pores formed in thick part of the resin film 1. Since the pores 2 do not pierce the resin film 1, they do not directly affect the function of the gas-liquid separation membrane. The pores 3 are gas-permeable through holes perforated in thin portions 4 of the resin film 1, and the gas-liquid separation portions (which will also be referred to hereinafter as "gas-permeable portions") 4 in which the gas-permeable pores 3 are formed, reveal the function as a gas-liquid separation membrane. A region where each gas-liquid separation portion 4 is located, is also referred to as a "gas-permeable region." The thickness of the gas-liquid separation portions 4 is 0.5 μm–20 μm.

The idle pores 2 are openings formed from the necessity of production of the gas-permeable pores 3. These pores 2, 3 are formed in complete round and taper shape by laser machining similar to boring, as described hereinafter. They become the unpierced idle pores 2 or the pierced gas-permeable pores 3, depending upon thicknesses of the resin film 1 in the regions where they are formed. Numeral 5 represents a non-opening part (hereinafter also referred to as a "non-permeable portion") where no gas-permeable pore 3 is formed, and a region where the non-opening part is located, is also called a "non-permeable region."

The laser machining permits the gas-permeable pores 3 to be formed in small diameter and in short length, so as to enhance the gas permeability performance and also secure the mechanical strength of the gas-liquid separation membrane. Significant factors for enhancing the gas permeability performance being the important performance of the gas-liquid separation membrane are the diameter and the number of gas-permeable pores 3, and the length of the gas-permeable pores 3. However, since the diameter of the gas-permeable pores 3 is in inverse proportion to withstand pressure performance being the property except the gas-liquid separation, the diameter and the number of gas-permeable pores 3, and the length of the gas-permeable pores 3 cannot be uniquely determined. The gas permeability performance is generally expressed by Eq (1) below based on the Hagen-Poiseuille formula.

$$\Delta p = 32\mu LV/D \quad (1)$$

In the equation $\Delta p$ is the permeation pressure of a fluid (gas), $\mu$ the viscosity of the fluid (gas), L the length of a tube (the length of the gas-permeable pores 3), V the velocity of flow, and D the diameter of the tube (the diameter of the gas-permeable pores 3).

Figure 3:
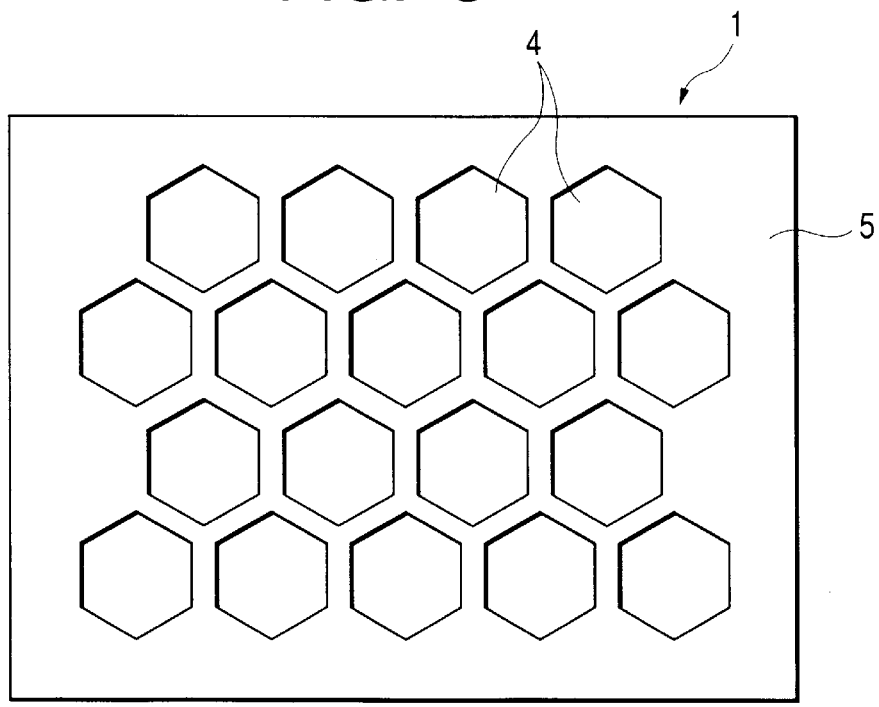
FIG. 3 is a macroscopic plan view of the gas-liquid separation membrane of FIG. 1.

In the present example, each gas-liquid separation portion 4 where a gas-permeable pore 3 is formed, is of plane regular hexagon shape. When the gas-liquid separation portions 4 are shaped in a regular polygon such as a plane regular hexagon or the like in this way, the gas-liquid separation portions 4 can be efficiently arranged in the resin film 1. FIG. 3 is a macroscopic view of an array form of the gas-liquid separation portions 4 in the present example. As apparent from FIG. 3, when the gas-liquid separation portions 4 are shaped in the plane polygon, they can be efficiently arranged and the strength of the entire resin 1 can be secured.

The withstand pressure of the gas-permeable pores 3 is calculated by Eq (2) below.

$$\rho g h = 4\gamma \cos\theta / D \quad (2)$$

In the equation $\rho$ is the density of the liquid, g the gravitational acceleration, h the difference between heights of inside and outside liquid levels of the tube, $\gamma$ the surface tension of the liquid, $\theta$ the angle of contact, and D the diameter of the gas-permeable pores.

A necessary condition is that the contact angle $\theta$ of the liquid at the gas-permeable pores is not less than 90°. If the contact angle $\theta$ is less than 90°, the interior of the gas-permeable pores will become wet with the liquid.

According to Inventor's calculation, in the case of surfaces at the gas-permeable pores 3 with relatively high water repellency like some fluorine water-repellent films, when the required withstand pressure was 0.2 atm, the necessary diameter D of the gas-permeable pores 3 was approximately 2μ. In the gas-permeable pores 3 of the present example, the portions demonstrating the function of gas-liquid separation are opening surfaces of opening diameter D1 (ΦD1), and the interior of the pores and the opening surfaces of opening diameter D2 (ΦD2) on the opposite side are irrespective in principle of the gas-liquid separation function. The opening surfaces of the opening diameter D1 are located in the lower gas-liquid separation surface in FIG. 2, which is in contact with the liquid, and the opening surfaces of the opening diameter D2 are located in the upper surface in FIG. 2, which is in contact with only the gas.

The gas-liquid separation membrane of the present example is used in arrangement in which the gas and liquid is present on the lower side in FIG. 2 and in which only the gas is made to pass through the gas-permeable pores 3 so as to be separated into the upper space in FIG. 2. A specific example of use is as follows: the gas-liquid separation membrane is placed at an upper wall portion of a liquid tank; air in the liquid tank is made to pass through the gas-permeable pores 3 to the outside until the liquid level in the liquid tank reaches a position of contact with the gas-liquid separation membrane; the gas-permeable pores 3 automatically block the permeation of the liquid when the liquid level reaches the gas-liquid separation membrane. In that case, by adopting a liquid introducing method of introducing the liquid from the outside into the liquid tank by making use of a negative pressure inside the liquid tank on the occasion of sucking the air in the liquid tank from the outside through the gas-liquid separation membrane, it is feasible to automatically stop the sucking of air when the liquid in the liquid tank reaches the gas-liquid separation membrane. The liquid tank may be an ink tank accommodating liquid ink.

The lower surface of the resin film 1 in FIG. 2 where the opening surfaces of the opening diameter D1 of the gas-permeable pores 3 are located, is also referred to as a "gas-liquid separation surface." By decreasing the length of the gas-permeable pores 3, it is feasible to enhance the permeability of gas while securing the withstand pressure of the gas-permeable pores 3. In the present example, as shown in FIG. 2, the demand for shortening the gas-permeable pores 3 can be met by decreasing the thickness t of the portions where the gas-permeable pores 3 are formed, i.e., the gas-liquid separation portions 4 effective to the gas-liquid separation function. An effective way of enhancing the permeability of gas is to set the opening diameter D2 of the opening surfaces making no direct contribution to the gas-liquid separation, greater than the opening diameter D1.

Figure 4:
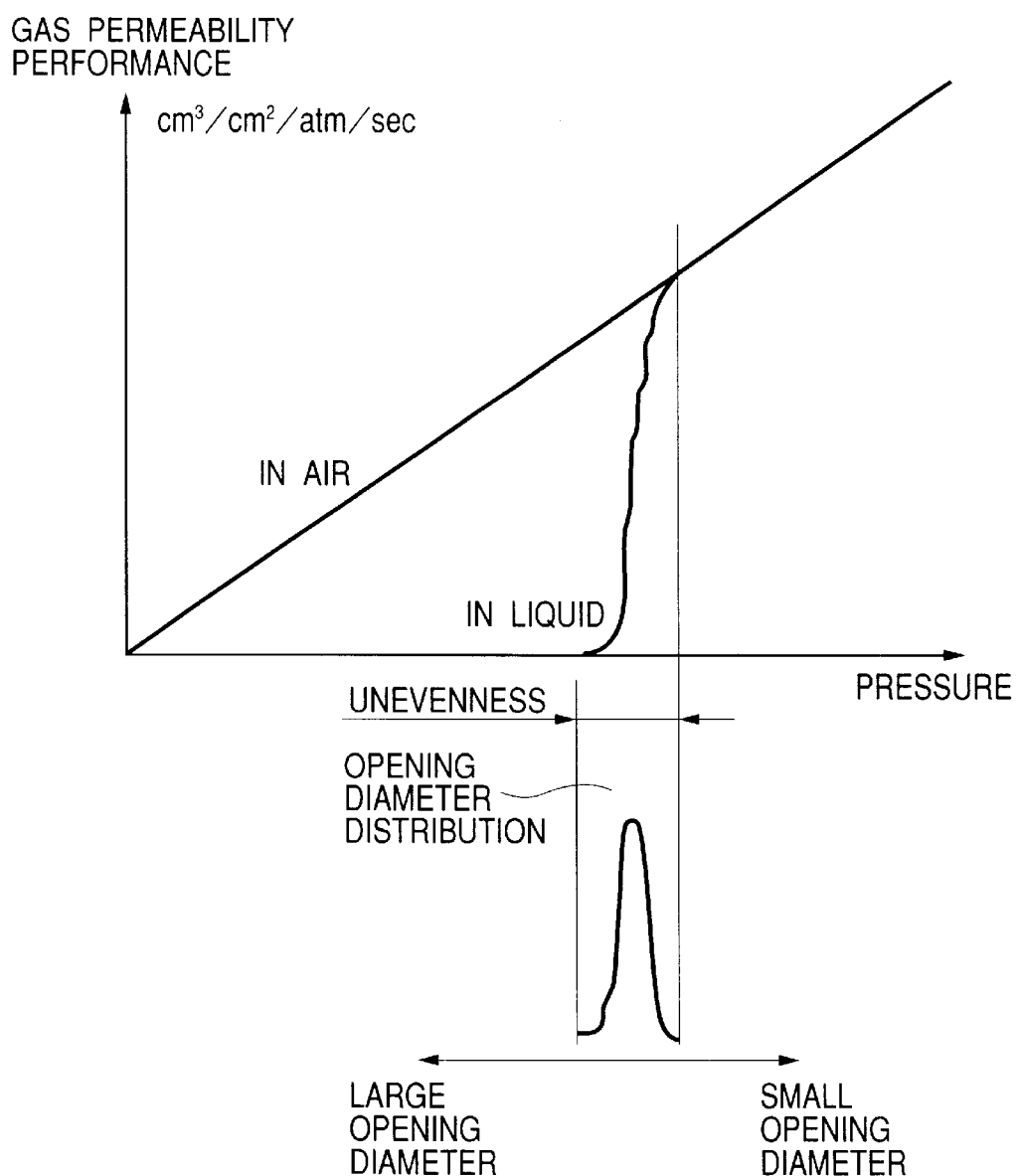
FIG. 4 is a graph to illustrate the film properties of the gas-liquid separation membrane of FIG. 1.

In the present example, the withstand pressure of the gas-permeable pores 3 exhibits little unevenness, as shown in FIG. 4, so that it is feasible to provide the gas-liquid separation membrane satisfying both the high permeability performance and high withstand pressure. When the gas-permeable pores 3 are formed by laser machining, as described hereinafter, the gas-permeable pores 3 can be formed independently of each other in even opening diameter and in uniform distribution. As a result, the gas-liquid separation membrane with any desired performance can be stably produced and provided.

Figure 5:
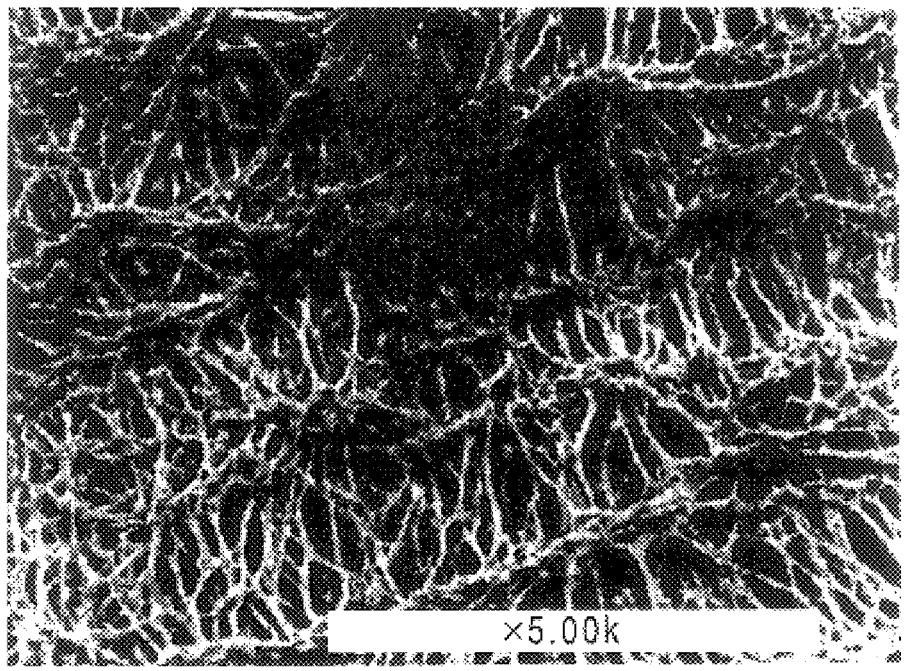
FIG. 5 is an enlarged photograph of a conventional gas-liquid separation membrane.
Figure 6:
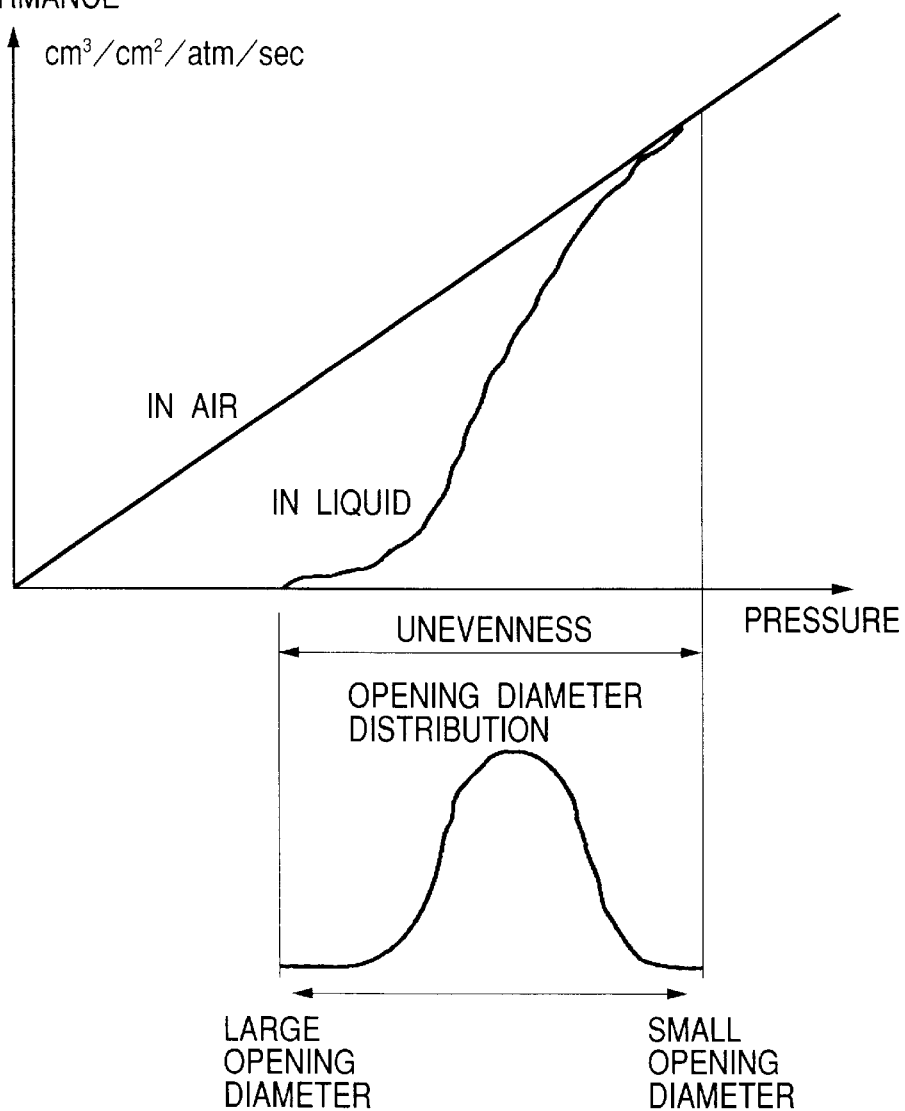
FIG. 6 is a graph to illustrate the film properties of the gas-liquid separation membrane of FIG. 5.

FIG. 5 presents an enlarged photograph of a porous film with a plurality of gas-permeable pores communicating with each other, as a conventional gas-liquid separation membrane. Since the gas-permeable pores were not accurately formed in the conventional gas-liquid separation membrane, there was great unevenness in the withstand pressure of capillary force necessary for the gas-liquid separation, as shown in FIG. 6. Namely, since the withstand pressure of the gas-liquid separation membrane is dependent upon a gas-permeable pore with the lowest withstand pressure, the withstand pressure performance largely differs, depending upon the unevenness of opening diameters, even among gas-liquid separation membranes with a plurality of gas-permeable pores having the same average opening diameter.

(Second Embodiment)

Figure 7:
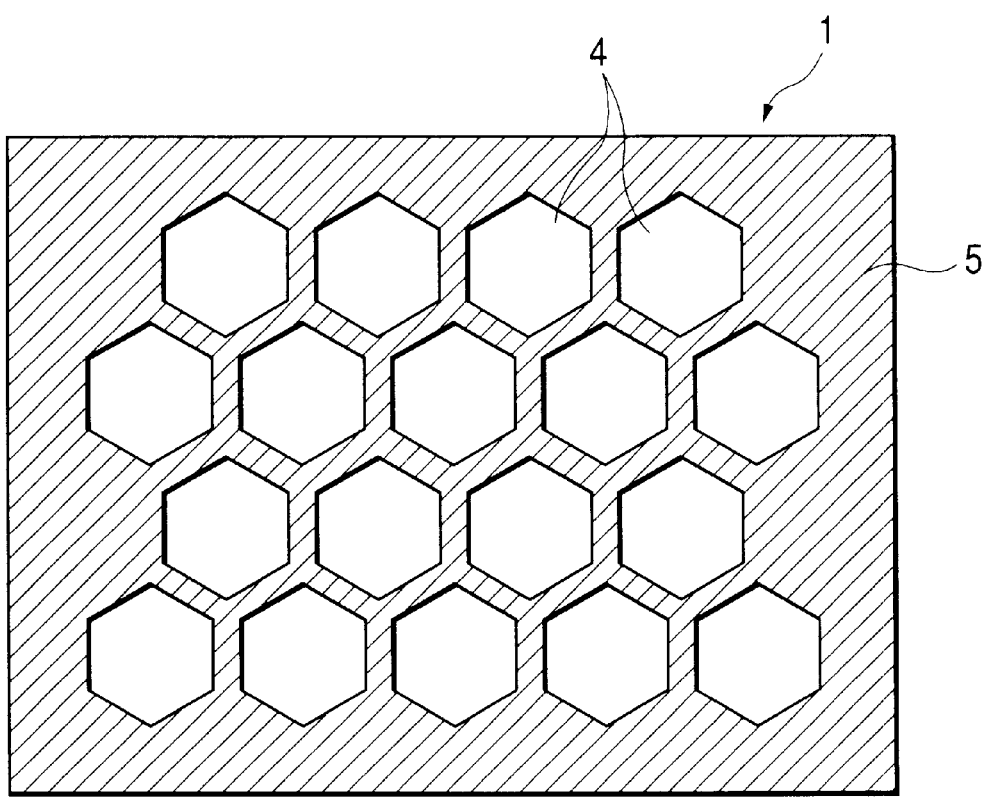
FIG. 7 is a plan view of a gas-liquid separation side of a gas-liquid separation membrane in a second embodiment of the present invention.

FIG. 7 is an enlarged plan view of a gas-liquid separation membrane for explaining the gas-liquid separation membrane as a second embodiment of the present invention, and macroscopically shows the gas-liquid separation portions 4.

In the present example, the gas-liquid separation surface (the lower surface in FIG. 2) in the region of the non-opening part 5 (non-permeable region) where the gas-permeable pores 3 demonstrating the gas-liquid separation function are not formed, in the first embodiment described above, is constructed of a hydrophilic surface. For example, the region of the non-opening part 5 is formed as a region not subjected to a water repellent treatment in the resin film 1, or a region treated by a hydrophilic treatment. Therefore, the water-repellent gas-liquid separation portions 4 and the hydrophilic non-opening part 5 are formed in the resin film 1. It is also possible to subject the former gas-liquid separation portions 4 to the water repellent treatment and the latter non-opening part 5 to the hydrophilic treatment.

Since the liquid tends to flow to the region of the hydrophilic non-opening part 5, the water repellency of the water-repellent gas-liquid separation portions 4 is substantially enhanced. This results in decreasing the probability of the liquid blocking up the gas-permeable pores 3 of the water-repellent gas-liquid separation portions 4 (the probability of liquid blockage), so as to make the lifetime longer as a gas-liquid separation membrane and thus enhance its reliability.

(Third Embodiment)

FIGS. 8A to 8D are diagrams to illustrate a production method of the gas-liquid separation membrane in the second embodiment described above, as a production method of a gas-liquid separation membrane according to the present invention.

Figure 8A:
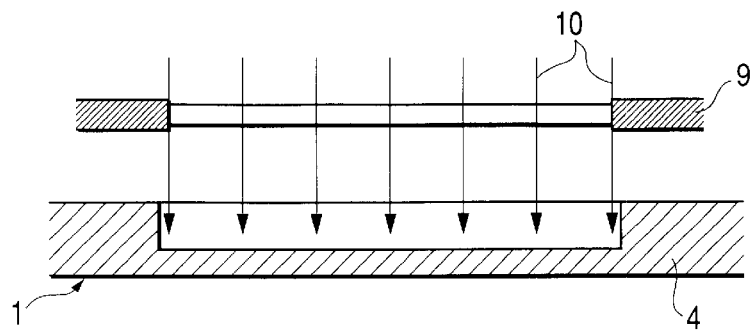
FIGS. 8A, 8B, 8C, and 8D are enlarged sectional views for explaining production steps of a gas-liquid separation membrane according to the present invention.
Figure 8B:
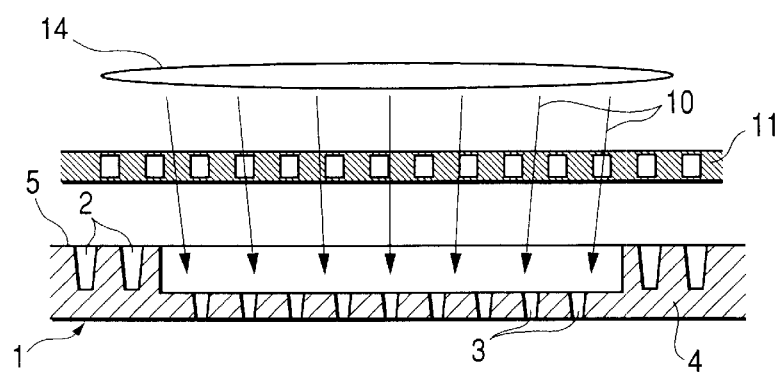
Figure 8C:
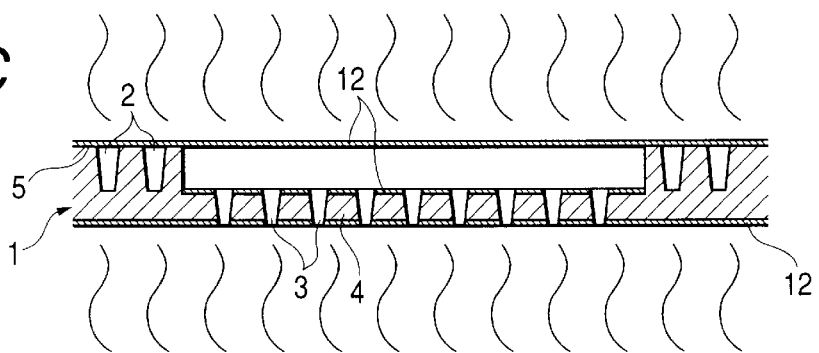
Figure 8D:
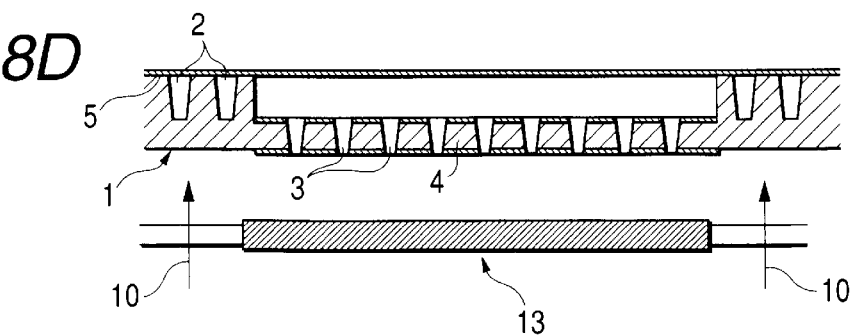

In FIG. 8A, first, portions corresponding to the gas-liquid separation portions 4 necessary for the gas-liquid separation function are formed in smaller thickness in the resin film 1 with laser light 10 guided through a mask 9. Then the gas-permeable pores 3 are perforated in the portions corresponding to the gas-liquid separation portions 4, using a mask 11, as shown in FIG. 8B. The gas-permeable pores 3 are formed in taper shape with gradually decreasing diameters toward the lower gas-liquid contact surface in the figure. This taper shape is defined by preliminarily converging the laser light 10 with a lens 14. On the occasion of forming the gas-permeable pores 3, the pores 2 are also formed in similar fashion to the gas-permeable pores 3. Since the non-opening part 5 where the pores 2 are formed, is a thick layer, the pores 2 do not pierce the thick layer, and they become idle holes. After completion of such laser machining, machining residues are removed with an adhesive. Specifically, the machining residues are made to adhere to the adhesive, whereby the machining residues are removed together with the adhesive. Thereafter, layers of a water-repellent material 12 (water-repellent layers) are formed as shown in FIG. 8C. The water-repellent layers can be formed, for example, by coating, transferring, sputtering, plating, or the like of the water-repellent material 12. The water-repellent material 12 can be one selected from the aforementioned various materials. Then the lower gas-liquid separation surface in the same figure in the non-opening part 5 is exposed to laser light 10 with a mask 13, as shown in FIG. 8D, to remove the layer of the water-repellent material 12 on the gas-liquid separation surface, whereby the gas-liquid separation surface there is changed to a hydrophilic surface.

The internal surfaces of the gas-permeable pores 3 may be wholly or partly formed as water-repellent surfaces. The regions at least around the opening portions of the gas-permeable pores 3 may be formed as water-repellent surfaces on at least one side of the upper and lower opening surfaces in FIGS. 8A to 8D of the gas-liquid separation membrane where the gas-permeable pores 3 are opening. A configuration wherein the regions at least around the opening portions of the gas-permeable pores 3 are made as water-repellent surfaces in the lower opening surface (gas-liquid separation surface) in FIGS. 8A to 8D, is effective to increase in the withstand pressure of the gas-liquid separation membrane. By making at least part of the surfaces of the gas-liquid separation membrane except for such water-repellent surfaces, as hydrophilic surfaces, it is feasible to substantially enhance the water repellency of the water-repellent surfaces, as described previously.

As described above, the present invention has provided the gas-liquid separation membrane in which the plurality of gas-permeable pores were formed by laser machining and in which the gas-permeable pores were formed independently of each other in even pore size and in uniform distribution, while enhancing the reliability and performance of the gas-liquid separation membrane.

What is claimed is:

1. A gas-liquid separation membrane comprising a plurality of gas-permeable pores that permit permeation of gas and that prevent permeation of liquid by capillary force, wherein said plurality of gas-permeable pores are formed independently of each other and in even pore size by laser machining.

2. The gas-liquid separation membrane according to claim 1, wherein said plurality of gas-permeable pores are formed at equal intervals.

3. The gas-liquid separation membrane according to claim 1 or 2, wherein internal surfaces of said plurality of gas-permeable pores are formed as water-repellent surfaces at least in part.

4. The gas-liquid separation membrane according to claim 1, wherein regions at least around opening portions of said plurality of gas-permeable pores are formed as water-repellent surfaces, in at least one of opening surfaces on one and the other sides of said gas-liquid separation membrane where said plurality of gas-permeable pores are opening.

5. The gas-liquid separation membrane according to claim 3, wherein said water-repellent surfaces are surfaces coated with a water-repellent material.

6. The gas-liquid separation membrane according to claim 3, wherein said water-repellent surfaces are surfaces coated with a composite plated layer in which a fluorine base material is dispersed.

7. The gas-liquid separation membrane according to claim 3, wherein surfaces of said gas-liquid separation membrane except for said water-repellent surfaces are formed as hydrophilic surfaces at least in part.

8. The gas-liquid separation membrane according to claim 1, wherein said plurality of gas-permeable pores are formed in a resin film having a film thickness of 0.5 $\mu$m–20 $\mu$m.

9. The gas-liquid separation membrane according to claim 1, which comprises gas-permeable regions where said plurality of gas-permeable pores are formed; and a non-permeable region where said plurality of gas-permeable pores are not formed.

10. The gas-liquid separation membrane according to claim 9, wherein a film thickness of said gas-permeable regions is smaller than a film thickness of said non-permeable region.

11. The gas-liquid separation membrane according to claim 9 or 10, wherein a plane shape of said gas-permeable regions is a regular polygon.

12. The gas-liquid separation membrane according to claim 9, wherein at least one of surfaces on one and the other sides of said non-permeable region is a hydrophilic surface.

13. The gas-liquid separation membrane according to claim 1, wherein said plurality of gas-permeable pores permit the permeation of the gas and prevent the permeation of the liquid in a direction directed from one-side surface to the other-side surface of said gas-liquid separation membrane, and wherein an inside diameter of said plurality of gas-permeable pores on one side of said gas-liquid separation membrane is smaller than that on the other side.

14. The gas-liquid separation membrane according to claim 13, wherein internal surfaces of said plurality of gas-permeable pores are taper surfaces.

15. The gas-liquid separation membrane according to claim 1, wherein surfaces of said gas-liquid separation membrane are formed as hydrophilic surfaces in part.

16. A method of producing a gas-liquid separation membrane comprising a plurality of gas-permeable pores that permit permeation of gas and that prevent permeation of liquid by capillary force, wherein said plurality of gas-permeable pores are formed independently of each other and in even pore size by laser machining.

17. The method according to claim 16, wherein, after said plurality of gas-permeable pores are formed by laser machining, machining residues are removed using an adhesive.

* * * * *